Figures 1, 2:
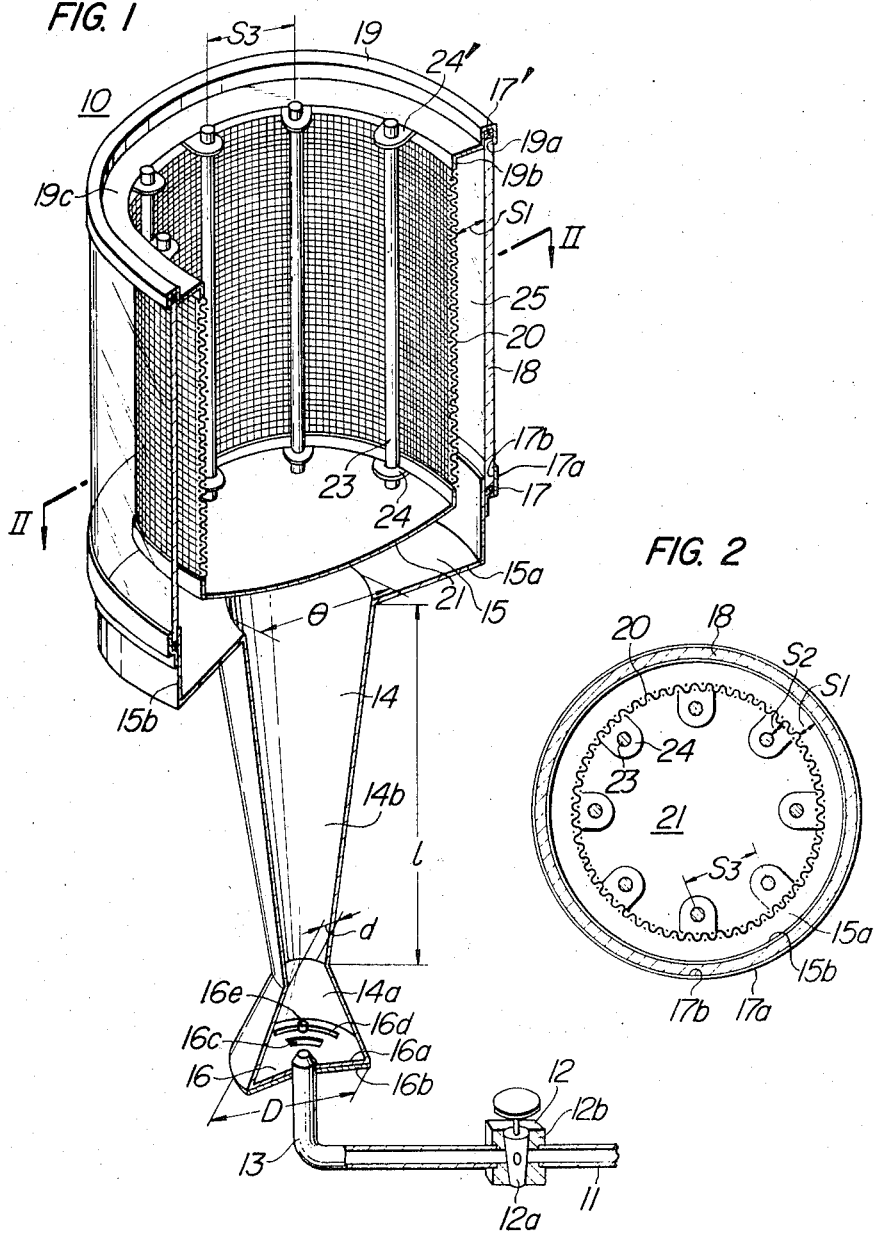

United States Patent [19]
Kobayashi et al.

[11] 3,733,170
[45] May 15, 1973

[54] GAS BURNER

[75] Inventors: Ikuo Kobayashi, Nara; Takao Tomizawa, Yamatokoriyama; Shigeo Murase, Takatsuki, all of Japan

[73] Assignee: Matsushita Electric Industrial Co., Osaka, Japan

[22] Filed: May 21, 1971

[21] Appl. No.: 145,863

[30] Foreign Application Priority Data

May 27, 1970 Japan .................... 45/52609

[52] U.S. Cl. ............................................. 431/329
[51] Int. Cl. .......................................... F23d 13/14
[58] Field of Search ..................... 431/100, 329; 122/4 D

[56] References Cited

UNITED STATES PATENTS

| | | | |
|---|---|---|---|
| 3,391,983 | 7/1968 | Harazono et al. | 431/329 |
| 3,407,025 | 10/1968 | Hardison | 431/329 |
| 2,634,232 | 4/1953 | Houdry | 122/4 |
| 2,872,906 | 2/1959 | Houdry | 122/4 |
| 3,147,960 | 9/1964 | Ruff | 431/329 X |

*Primary Examiner*—Kenneth W. Sprague
*Attorney*—Stevens, Davis, Miller & Mosher

[57] ABSTRACT

A gas burner having a cylindrical glass member and a cylindrical screen of metal wires having closed bottom end and disposed and spaced inwardly from the glass member to define therebetween an annular gas passage space which is closed at the top thereof by an annular cap. The space enclosed by the glass member is substantially closed at the lower end by an annular bottom wall which cooperates with the closed bottom end of the screen and a part of the glass member to define a mixing chamber which is in communication with air-fuel mixture supply source and the annular gas passage space whereby the mixture is fed from the supply source through the mixing chamber to the cylindrical screen through which the mixture is passed inwardly and burnt to form combustion flames on the inner surface of the screen. Heat catalystic members are disposed inwardly of the cylindrical screen to facilitate complete combustion of the fuel.

13 Claims, 2 Drawing Figures

PATENTED MAY 15 1973

3,733,170

GAS BURNER

The present invention relates to a gas burner of a kind that employs a heat radiating cylindrical outer member and a cylindrical screen defining therewith an annular space or passage for air-gas mixture from a mixing chamber, the mixture being passed through the perforations in the screen and burnt on the inner surface thereof so that the screen is red heated to radiate infrated rays which are passed through the heat radiating cylindrical outer member to an object.

There has been a conventional gas burner of a type that employs an apertured or perforated body of a refractory material which is heated by a Bunsen burner to an elevated temperature to radiate heat. There has also been another type of gas burner that employs a perforated ceramic plate or plates. With the burner of this type, the air-fuel mixture is passed through the perforations in the ceramic plate and is burnt by the aid of an auxiliary air obtained from the atmosphere adjacent the outer surface of the plate so that the latter is red heated to emit radiation.

The gas burners of these types are disadvantageous for the reasons well-known in the art. In order to eliminate these disadvantages, there has been proposed an improved gas burner of a type that employs a cylindrical perforated body of a metal, such as a tubular screen of metal wires, having an closed end. The other end of the cylindrical body is opened and connected to an air-gas mixture supply source so that the mixture is fed from the supply source into the space defined by the cylindrical body. The mixture is then passed through the perforations in the peripheral wall of the cylindrical body and is burnt on the outer surface of the body to red heat the same so that the cylindrical body radiates infrared rays.

With the gas burner of this type, because the air-gas mixture is fed through one open end of the cylindrical body, it is required that the interior of the cylindrical body be kept at uniform gaseous pressure throughout the entirety of the interior and that the mixture be passed through the perforations in the wall of the cylindrical body at a constant rate during operation so that the surface of the cylindrical body is kept at a uniform temperature throughout the area thereof. Stated in more detail, there is a tendency that the portion of the cylindrical burner member adjacent the inlet opening for the air-gas mixture is supplied with a smaller amount of mixture while the portion of the burner member remote from the inlet opening is supplied with a larger amount of mixture. In order to equalize the unequal fuel supply, it is unavoidably required that the total area of the perforations in the perforated burner member be of a smaller ratio relative to the entire surface area of the member while the interior of the burner member is maintained at a higher pressure. Despite the higher pressure within the space defined by the cylindrical burner member, the reduced perforation area fails to allow the air-gas mixture to pass through the perforations at a sufficient rate to provide the fuel with the main air supply of an amount appropriate for complete combustion of the fuel. Thus, an auxiliary air supply is obtained from the atmosphere around the outer surface of the cylindrical burner member for complete combustion of the fuel, with a result that combustion flames are produced in an annular zone around the outer surface of the burner member. For the reasons, the latter cannot be completely red heated. In other words, the burner member cannot be heated to a temperature higher than 800°C.

In order to obtain higher temperature, an attempt has been made to construct such burner member by use of laminated sheets of metal screens. This attempt, however, has failed to provide a satisfactory gas burner because the gas being burnt is cooled by the outermost layer of screen resulting in the production of harmful gases such as carbon monoxide gas.

The gas burner of the kinds above-stated is also disadvantageous in the following points:
1. The burner is unable to burn a large amount of fuel with a relatively small combustion surface;
2. Thus, the burner is required to have a bulky size;
3. The burner is apt to produce incomplete combustion because the temperature of the metal screen is lowered when the pressure of fuel gas is lowered.
4. The burner is not suited for universalized application and, thus, a different burner must be required for a different kind of fuel gas.

It is a principal object of the present invention to provide an improved gas burner which eliminates the afore-stated disadvantages.

It is another object of the present invention to provide a gas burner which is operative to generate an elevated temperature.

It is a further object of the present invention to provide a gas burner which is operative to generate a strong heat radiation.

It is a still further object of the present invention to provide a gas burner which is operative to produce complete combustion of fuel.

It is a still further object of the present invention to provide a gas burner which is constructed with materials which suffer from lesser deterioration.

It is a still further object of the present invention to provide a gas burner which is suited for universalized application or operation.

A still further object of the present invention is to provide a gas burner which is operative to produce stable and complete combustion.

A still further object of the present invention is to provide a gas burner which is adjustable in a widened range so that the burner is operable with various kinds of fuels.

A still further object of the present invention is to provide a gas burner which has a simplified construction.

A still further object of the present invention is to provide a gas burner which provides stable operation irrespective of atmospheric condition.

A still further object of the present invention is to provide a gas burner which is operative to generate larger output as compared with relatively smaller size and compactness of the burner while the same is operable with naturally supplied fuel and air.

It is a still further object of the present invention to provide a gas burner which provides a clear heat radiating surface during operation.

According to the present invention, there is provided a gas burner comprising a fuel injection nozzle, a mixing tube into which the fuel is injected from said nozzle, the flow of the injected fuel sucking main air into said mixing tube so that the fuel is mixed with the air, a mixing chamber connected to and communicating with said mixing tube, a cylindrical outer member of a heat-resistant and heat-permeable material mounted at the bottom end on a bottom wall of said mixing chamber with a gasket interposed therebetween, a cylindrical screen of metal wires spaced inwardly from said cylindrical outer member to define therebetween an annular space in communication with said mixing chamber, an annular cap closing the top end of said annular space, the bottom end of said cylindrical screen being spaced upwardly from said bottom wall, a bottom plate closing the bottom of said cylindrical screen to cooperate with said bottom wall to define said mixing chamber, said annular space providing a passage for the air-fuel mixture from said mixing chamber, a plurality of spaced heat catalystic members disposed inwardly of said cylindrical screen, the mixture being burnt on the inner surface of said screen and on the surfaces of said heat catalystic members.

The cylindrical outer member may preferably be made of crystallized glass. The heat catalystic members may preferably be made of a sintered material the main component of which is α-alumina. Alternatively, the heat catalystic members may be made of a ceramic material, glass, a heat-resistant metal or the like.

The other objects, features and advantages of the present invention will be made apparent by the following description of a preferred embodiment of the present invention with reference to the accompanying drawings.

FIG. 1 is a perspective view of an embodiment of the gas burner according to the present invention with a part of the burner being broken away to illustrate the inner structure thereof; and FIG. 2 is a cross-section taken substantially along line II—II in FIG. 1.

Referring first to FIG. 1, the burner 10 of the present invention comprises a fuel supply conduit 11 having provided therein a valve 12 for regulating or adjusting the flow of the fuel. The valve 12 is connected with a fuel jetting nozzle 13 extending into an air-fuel mixing tube 14. The end of the mixing tube 14 at which the nozzle 13 is connected to the tube 14 is provided with means 16 for adjusting the flow of main air into the tube 14. The latter is opened at the other end to a mixing chamber 15 partially defined by an annular bottom wall 15a and a cylindrical wall 15b extending upwardly at right angles from the outer peripheral edge of the bottom wall. Annular flange 17a is rigidly mounted on the peripheral outer surface of the cylindrical wall 15b to cooperate therewith to define an upwardly opening annular groove 17b in which an annular heat-resistant gasket 17 of an inorganic fibrous material is mounted. A cylindrical hollow member 18 of a heat-resistant and heat-permeable material such as crysterized glass is received at one or bottom end in the annular groove 17b. The cylindrical hollow member 18 is received at the other or top end in a downwardly opened annular groove 19a defined by a peripheral outer edge portion of an annular top member or cap 19. Annular gasket 17', similar to the gasket 17, is interposed between the upper end of the hollow member 18 and the bottom of the annular groove 19a. A cylindrical body 20 of metal wire screen is disposed within the space defined by the cylindrical hollow member 18 and is spaced a distance S1 inwardly therefrom. The cylindrical screen 20 is secured at the upper end to the inner peripheral edge of the top plate 19 and is closed at the bottom by means of a bottom plate 21. Moreover, an annular row of a plurality of heat-resistant catalytic members 23 is disposed within the space defined by the cylindrical screen 20 and is spaced a distance inwardly therefrom, each of the catalystic members 23 being supported at the bottom end by a bracket 24 extending inwardly from a cylindrical portion of the bottom plate 21. The upper ends of the catalystic members 23 are supported by similar brackets 24' extending inwardly from and secured to the inner peripheral edge of the top plate 19.

The burner 10 will be described in more detail. The fuel supply tube 11 is threadably connected to one side of a valve body 12b which defines a frusto-conical bore which receives a valve member 12a which is formed therein with a gas passage. The nozzle 13 is threadably connected at one end to the other side of the valve body 12b and is directed at the other end to an inlet 14a of the mixing tube 14.

The means 16 for adjusting the flow of main air comprises an air-damper base 16a secured to the bottom end face of the inlet 14a and an air-damper rotary plate 16b mounted for rotation about the forward end of the nozzle 13 in slidable contact with the air-damper base 16a. The air-damper base 16a is formed therein with an arcuate opening 16c. The air-damper rotary plate 16b is also formed with a similar opening (not shown) so that these openings are brought into partial or complete registration with each other upon rotation of the rotary plate 16b with respect to the base 16a so as to adjust the flow of the main air into the air-fuel mixing tube 14 according to a specific kind of the fuel for thereby enabling a complete combustion to be obtained. The rotation of the rotary plate 16b with respect to the base 16a is partly guided by an annular slit 16d in the base 16a and by a shunk of a bolt (not shown) extending through the rotary plate 16b and the slit 16d and screwed into a nut 16e disposed inwardly of the base 16a. The bolt and the nut 16e are tightened together to releasably secure the air damper base and rotary plate 16a and 16b together in an appropriate relative position in which a desired amount of main air flow is allowed to pass through the opening 16c into the mixing tube 14.

The air-fuel mixing tube 14 comprises the inlet 14a and a mixing section 14b. The inlet 14a converges forwardly or upwardly to provide at the upper end a throat at which the inlet 14a is connected to the mixing section 14b which diverges upwardly and is secured at the top end to the inner peripheral edge of the annular bottom wall 15a of the mixing chamber 15.

The mixing tube 14 is appropriately dimensioned according to the shape of the burner, the output capacity of the same etc. As an example, the mixing tube 14 may be sized such that:

The diameter D of the inlet 14a is 60 mm;
The diameter d of the throat is 20 mm; and
The diameter of the upper end of the mixing section 14b is 30 mm;

The length of the mixing section 14b is 140 mm. This dimensioning is suited to a case where the burner 10 with a nozzle of 2.7 mm in diameter is operated with town gas of 4,500 kcal/m$^3$ under pressure of 40 to 100 mm $H_2O$. In this instance, the burner generates an output of 3,000 kcal/hr with the fuel fed under the pressure of 70 mm $H_2O$ and with the air-passage opening 16c being adjusted to provide 0.78 to 5.85 cm$^2$.

Each of the gaskets 17 and 17' in the grooves 17b and 19a is made of a mass of an inorganic fibrous material such as $SiO_2$, $Al_2O_3$, $NaO_3$, $CaO$, etc. to provide sealing, shock-absorbing and heat-insulating functions.

The cylindrical screen 20 is made of a sheet-like screen which is formed into a cylindrical shape and is held in this form by means of spot or seam welding. The screen is woven with wires of a heat-resistant metal such as iron-chromium or nickel-chromium in such a manner that the distance between each adjacent pair of weft wires is substantially the same as the distance between each adjacent pair of warp wires. The cylindrical screen 20 thus formed is welded at the upper end to the inner peripheral edge 19b of the annular top plate or cap 19 and at the bottom end to a short cylindrical portion of the bottom plate 21 which preferably is of downwardly convex shape to facilitate uniform distribution of the air-fuel mixture from the mixing tube 14. The screen 20 is radially inwardly spaced a distance S1 from the cylindrical heat-permeable outer member 18. The annular space defined between the cylindrical outer member 18 and the screen 20 is closed at the top by an annular intermediate section of the cap 19.

It is particularly to be noted that the heat catalystic members 23 are disposed inwardly of the cylindrical screen 20 as best seen in FIG. 2. In a preferred embodiment, each of the members 23 is made of a sintered porous material the main component of which is $\alpha$-alumina.

As an example, the wires from which the screen 20 is made may have a diameter ranging from 0.15 mm to 0.55 mm. The screen 20 may include 20 to 50 wires within a dimension of 25.4 mm in both warp and weft directions.

In addition to $\alpha$-alumina, the sintered material from which the catalystic members 23 are made may include $CaO$, $Fe_2O_3$, $MgO$, $SiO_2$, etc. Each of the catalystic members 23 may be in the form of a column having an outer diameter of about 6 mm. The column may be a cylindrical form having annular or polygonal cross-section. Alternatively, a catalystic member of one piece structure may be employed in place of a plurality of separate columns. In this alternative case, the one piece structure may preferably be in the form of a cylindrical hollow body of a larger diameter having a perforated or apertured peripheral wall. The annular row of catalystic members 23 is spaced a distance S2 inwardly from the cylindrical screen 20.

The distance S1 between the cylindrical glass 18 and the cylindrical screen 20 and the distance S2 between the screen 20 and the catalystic members 23 are maintained unchanged in the axial and circumferential directions of the burner. In addition, the catalystic members 23 are circularly disposed at an interval S3. The distances S1, S2 and S3 may be within the following ranges:

S1 = 6 to 15 mm;
S2 = 1 to 10 mm; and
S3 = 5 to 40 mm.

These values may be variable with the variations in the output capacity of burners and burner temperatures required for particular applications. However, the burners according to the present invention may facilitate better burning condition if the values in question are within the above-mentioned ranges.

As an example, a burner required to generate an output of 3,000 kcal/hr may be constructed in accordance with the following specification:

| | |
|---|---|
| Wire for screen 20 | 0.25 mm in diameter; |
| Coarseness of screen 20 | 40 mesh (40 wires in 1 inch in both warp and weft directions); |
| Length (axial dimension) of screen 20 | 90 mm; |
| Diameter of screen 20 | 72 mm; |
| Distance S1 | 10 mm; |
| Distance S2 | 2 mm; and |
| Distance S3 | 20 mm. |

A burner made of the components having the above-specified dimensions provides a better combustion.

A description will then be made with respect to the operation of the burner according to the present invention. When the valve 12 is opened, fuel gas is fed from the supply tube 11 to the nozzle 13 from which the gas is introduced into the air-fuel mixing tube 14. The gas thus introduced sucks air into the tube 14 through the opening 16c. The gas and air are mixed within the mixing tube 14 to produce a mixture which is introduced through the opening defined by the annular bottom plate 15a into the mixing chamber 15. The downwardly convex bottom wall 21 of the cylindrical screen 20 substantially uniformly distributes the mixture to the space defined between the cylindrical outer glass 18 and the cylindrical screen 20.

The mixture is uniformly fed to the screen 20 and passes inwardly through the mesh of the screen and is injected inwardly therefrom while the mixture is subjected to the resistance by the wires of the screen. When the mixture is ignited, the combustion takes place on the inner surface of the screen to red heat the same. The combustion is such that flames project radially inwardly from the screen toward the heat catalystic members 23 so that the flames heat the same. Since the catalystic members 23 have low heat conductive efficiency, the same facilitates complete combustion of the incompletely burnt fuel contained in the flames adjacent the outer surfaces of the catalystic members 23 as soon as the same are heated by the flames. The complete combustion further heats the catalystic members to red-heat temperature. Thus, there occurs thermal interference between the red heated cylindrical screen 20 and the red heated catalystic members 23 to keep their surfaces at remarkably elevated temperature so that the inside of the burner is heated to a remarkably elevated temperature.

For the reason, the screen generates infrared rays which are passed through the outer cylindrical glass member 18 to an object.

It will be understood that the outer cylindrical member may be constituted by a cylindrical member of a metal so that the latter emits radiant heat.

The product by the complete combustion is discharged upwardly of the burner through the spaces between each adjacent pair of catalystic members 23. A burner of this design is advantageous in that the upward discharge of the combustion product produces strong draft which facilitates smooth suction of the main air into the burner.

The gas burner of the afore-described structure provides the following advantages:

1. High burner temperature;

The heat catalystic members disposed inwardly of the cylindrical screen facilitates complete combustion of the fuel on the surface of the members. The red heat in the surfaces of the catalystic members and the red heat in the cylindrical screen thermally interfere with each other to keep the catalystic members at a high temperature so that the atmosphere inside of the burner is heated to an elevated temperature.

2. Strong radiation;

The complete combustion of the fuel gas and the thermal interference cause the cylindrical screen and the catalytic members to be heated to about 850°C so that these components generate strong heat radiation having wave length of about 3 $\mu$ which is suited for enabling the burner to be used as a heat source for a heater or a dryer.

3. Complete combustion of fuel;

The burner of the present invention produces complete combustion of the fuel for the afore-discussed reasons. Thus, the burner eliminates any environmental pollution.

4. Lesser deterioration of burner material;

Since the burner of the present invention is designed such that the heat catalystic members made of alumina, etc. are disposed in the position where highest temperature is generated and that the cylindrical screen which is subjected to air-fuel mixture at a lower temperature is made of a heat-resistant metal such as Fe—Cr alloy.

5. Universability of burner;

a. The generation of high temperature within the burner owing to the operation of the heat catalystic members facilitates strong draft effect so that an increased amount of air is sucked into the burner, with a result that a better air-fuel mixture is produced. This compensates the difference in the ratio of the mixture of air relative to wide variety of fuel gases ranging from a gas whose main component is hydrogen to a gas whose main component is butane.

b. Since the burner provides a high temperature combustion area adjacent the heat catalystic members and a low temperature combustion area adjacent the metal wire screen, a hydrocarbonic fuel such as propane, butane, etc. is dissolved to produce active molecules, which affords a transition period of time which is required until a stable combustion state is obtained. Thus, the burner is operable with any kind of fuel gas.

6. Stable and complete combustion;

Since the interior of the burner is kept at an elevated temperature by the combustion adjacent the heat catalystic members disposed inwardly of the cylindrical screen about which a combustion also takes place, the active molecules which are to cause chain reactions of combustion are prevented from otherwise being brought into contact with a cooled combustion chamber wall or an air flow at a lower temperature. The active molecules are thus prevented from being dissolved to thereby provide stable and complete combustion state.

7. Adjustability in widened range;

Since the heat catalystic members facilitate generation of an elevated temperature within the burner, there is generated a strong draft effect which contributes to suction of sufficient amount of air for any controlled flow rate of a desired fuel. Thus, the flow rate of the air may be controlled in a widened range so that the burner is well operative to produce complete combustion of various kinds of gases.

8. Simplified structure;

The burner of the present invention is of a simplified structure and arrangement as described hereinabove and is of a type that is operable with naturally supplied fuel and main air. In addition, the burner does not require auxiliary air supply.

9. Silent combustion;

The air-fuel mixture is supplied at a relatively higher speed to the cylindrical screen. Unlike the prior art cylindrical screen, that of the present invention is of a single layer. In addition, the burner of the present invention has a relatively larger burner openings, with a result that a silent combustion takes place at the openings. Thus, the burner can be used in a place where silence is required.

10. Stable operation against atmospheric air flow;

The cylindrical outer member or shield protects the flames against atmospheric air flow so that the burner operation is not influenced by atmospheric condition and produces a stable combustion of fuel.

11. High load burner;

The cylindrical outer shield provides a kind of chimney effect which facilitates a high-speed upward discharge of the combustion product which discharge in turn serves to draft a flow of air-fuel mixture at an increased rate, with a result that the mixture is passed through the meshes in the cylindrical screen at an increased rate. In other words, the present invention provides a high load burner (burner capable of producing larger output as compared with relatively smaller size and compactness thereof) while the burner is of a type that utilizes naturally supplied fuel and air.

12. Clear heat radiation surface;

The combustion reaction takes place at the side of the cylindrical screen opposite to the cylindrical outer glass member while the thermal energy is delivered out of the side of the screen adjacent the cylindrical outer glass member. For this reason, the combustion flames are invisible so that the heat radiation surface of the screen presents a clear view.

13. Wide variety of application;

The above-described and illustrated embodiment is directed to a cylindrical burner of a circular cross-section. It is, however, to be noted that similar advantages are also obtainable from a burner of a polygonal or oval cross-section and even from that of a substantially flatly deformed oval cross-section. It is also to be noted that the burner of the present invention is not limited to a hollow shape. The cylindrical screen and glass member may be developed into a flat and plain shape along which the heat catalystic members are disposed.

Due to the weave length characteristic of the burner of the present invention, the burner is especially suited for heating and drying. However, the burners according to the invention are not limited to such application. Burners of such modified shapes as mentioned in the above may be employed as heat sources for various purposes and are operable in various kinds of applications including not only indoor one but also outdoor one.

What is claimed is:

1. A gas burner comprising a fuel injection nozzle, a mixing tube into which the fuel is injected from said nozzle, the flow of the injected fuel sucking main air into said mixing tube so that the fuel is mixed with the air, a mixing chamber connected to and communicating with said mixing tube, a cylindrical outer member of a heat-resistant and heat-permeable material mounted at the bottom end on a bottom wall of said mixing chamber with a gasket interposed therebetween, a cylindrical screen of metal wires spaced inwardly from said cylindrical outer member to define therebetween an annular space in communication with said mixing chamber, an annular cap closing the top end of said annular space, the bottom end of said cylindrical screen being spaced upwardly from said bottom wall, a bottom plate closing the bottom of said cylindrical screen to cooperate with said bottom wall to define said mixing chamber, said annular space providing a passage for the air-fuel mixture from said mixing chamber, a plurality of spaced heat resistant column members disposed inwardly of said cylindrical screen, the mixture being burnt on the inner surface of said screen and on the surfaces of said heat resistant column members.

2. A gas burner according to claim 1 in which said cylindrical screen comprises wires of a heat-resistant metal, said wires each being of a diameter ranging from 0.15 mm to 0.55 mm, said screen comprising 20 to 50 wires within a dimension of 25.4 mm in both warp and weft directions.

3. A gas burner according to claim 1 in which said heat resistant column members are each made of sintered material.

4. A gas burner according to claim 1 in which the space between said cylindrical screen and said cylindrical outer member is within the range from 6 mm to 15 mm.

5. A gas burner according to claim 1 in which the assembly of said cylindrical outer member, said cylindrical screen and said heat resistant column members is one of generally annular cross-sections.

6. A gas burner according to claim 1 in which said cylindrical outer member is made of glass.

7. A gas burner according to claim 3 in which said heat resistant column members are each made of a sintered material the main component of which is $\alpha$-alumina.

8. A gas burner according to claim 1 in which said heat resistant column members are each made of a ceramic material.

9. A gas burner according to claim 1 in which said heat resistant column members are each made of glass.

10. A gas burner according to claim 1 in which said heat resistant column members are each made of a heat-resistant metal.

11. A gas burner according to claim 1 in which the assembly of said cylindrical outer member, said cylindrical screen and said heat resistant column members is of polygonal cross-sections.

12. A gas burner according to claim 1 in which the assembly of said cylindrical outer member, said cylindrical screen and said heat resistant column members is of oval cross-sections.

13. A gas burner according to claim 1 in which the assembly of said cylindrical outer member, said cylindrical screen and said heat resistant column members is of substantially flatly deformed oval cross-sections.

* * * * *